United States Patent
Furukawa

(10) Patent No.: US 8,594,332 B2
(45) Date of Patent: Nov. 26, 2013

(54) KEY GENERATING APPARATUS, ENCRYPTING APPARATUS AND DECRYPTING APPATATUS

(75) Inventor: Jun Furukawa, Tokyo (JP)

(73) Assignee: NEC Corporation, Tokyo (JP)

( * ) Notice: Subject to any disclaimer, the term of this patent is extended or adjusted under 35 U.S.C. 154(b) by 648 days.

(21) Appl. No.: 12/601,597

(22) PCT Filed: Apr. 17, 2008

(86) PCT No.: PCT/JP2008/057506
§ 371 (c)(1),
(2), (4) Date: Nov. 24, 2009

(87) PCT Pub. No.: WO2008/146546
PCT Pub. Date: Apr. 12, 2008

(65) Prior Publication Data
US 2010/0172496 A1 Jul. 8, 2010

(30) Foreign Application Priority Data
May 25, 2007 (JP) .................. 2007-138939

(51) Int. Cl.
*H04L 9/30* (2006.01)
*H04L 9/00* (2006.01)
*H04K 1/00* (2006.01)
*G06F 17/00* (2006.01)
*H04L 9/12* (2006.01)
*H04L 9/08* (2006.01)
*H04L 9/32* (2006.01)
*H04L 9/06* (2006.01)

(52) U.S. Cl.
USPC ............... 380/277; 380/30; 380/44; 380/46; 380/278

(58) Field of Classification Search
USPC .................. 380/277, 30, 44, 46, 278
See application file for complete search history.

(56) References Cited

U.S. PATENT DOCUMENTS 5,054,066 A * 10/1991 Riek et al. .................. 380/30
7,590,236 B1 * 9/2009 Boneh et al. ............... 380/30
(Continued)

FOREIGN PATENT DOCUMENTS

JP 03-073633 3/1991
JP 2002-367282 12/2002
(Continued)

OTHER PUBLICATIONS

Braun, Johannes; Wiesmaier, Alexander; Buchmann, Johannes; "On the Security of Encrypted Secret Sharing"; System Sciences (HICSS), 2013 46th Hawaii International Conference on Digital Object Identifier: 10.1109/HICSS.2013.426; Publication Year: Feb. 2013; pp. 4966-4975; IEEE Conference Publications.*

(Continued)

*Primary Examiner* — Kambiz Zand
*Assistant Examiner* — Courtney Fields
(74) *Attorney, Agent, or Firm* — Young & Thompson

(57) ABSTRACT

A calculation device for calculating two groups G and $G_T$ the orders of which are identical to each other and in which a bilinear mapping from two elements belonging to the group G and to the group $G_T$ is existent is provided. A public key, a master key, an attribute value number, a user number, and a random number are input, an attribute value indicated by the attribute value number is summed up with an element of the master key, an attribute value secret, the reciprocal of the sum, is generated, a user-specific random number is generated by using the user number and the random number, a user-specific secret is generated from the user-specific random number and the public key, and the attribute value secret is exponentiated to the user-specific secret to generate a user-specific attribute value secret key.

8 Claims, 6 Drawing Sheets

(56) References Cited

U.S. PATENT DOCUMENTS

2004/0037424 A1* 2/2004 Numao et al. ............... 380/277
2005/0044083 A1* 2/2005 Sako ........................... 707/100

FOREIGN PATENT DOCUMENTS

| | | |
|---|---|---|
| JP | 2004-032209 | 1/2004 |
| JP | 2004-297578 | 10/2004 |
| JP | 2006-163164 | 6/2006 |
| JP | 2006-330566 | 12/2006 |
| WO | WO 2011099325 A1 * | 8/2011 |

OTHER PUBLICATIONS

Amit Sahai, Brent R. Waters, Fuzzy Identity Based Encryption, Lecture Notes in Computer Science, 3494, Springer Berlin/ Heidelberg, May 2005, pp. 457 to 473.

Ryuichi Sakai, Masao Kasahara, "Koritsu no Yoi Atarashii Hosoyo Ango", 2007 Nen Symposium on Cryptography and Information Security Yokoshu, 3C3-1, The Institute of Electronics, Information and Communication Engineers, Jan. 23, 2007, pp. 1 to 4.

Jun Furukawa, Nuttapong Attrapadung, Ryuichi Saka Goichiro Hanaoka, A Fuzzy ID-Based Encryption Efficient when Error Rate is Low, 2008 Nen Symposium on Cryptography and Information Security Yokoshu, 4D2-4, The Institute of Electronics, Information and Communication Engineers, Jan. 22, 2008, pp. 1 to 6.

International Search Report, PCT/JP2008/057506, Jul. 8, 2008.

Office Action dated Jan. 22, 2013 from the Japanese Patent Office in counterpart Japanese Patent Application No. 2009-516217 with English translation of portions enclosed in wavy lines, 3 pages.

Baek, Joonsang et al., New constructions of fuzzy identity-based encryption, SIACCS '07 Proceedings of the 2nd ACM symposium on Information, computer and communications security, ACM, Mar. 2007, p. 368-370.

Furukawa, Jun, Short Anonymous, Hierarchical Identity-Based Encryption and Hierarchical Identity-Coupled Broadcast Encryption, 2008 Symposium on Encryption Information Security, Collections CD-ROM, IEICE, Jan. 22, 2008, 4D2-5, p. 1-7.

* cited by examiner

KEY GENERATING APPARATUS, ENCRYPTING APPARATUS AND DECRYPTING APPATATUS

FIELD OF THE INVENTION

The present invention relates to an encrypting technique that allows a receiver having secret keys each corresponding to a certain or more number of attribute values among attributes designated in generating a cryptogram, the receiver being one of those that have secret keys corresponding to some of a plurality of existing attribute values, to decrypt the cryptogram which has been generated after designating a set of attributes, and more particularly, to an encrypting technique allowing additionally designation of a receiver set, allowing a person who can decrypt a cryptogram to have a secret key, and limited to individuals belonging to the receiver set, in generating the cryptogram.

DESCRIPTION OF THE PRIOR ART

One of encrypting method based on a fuzzy identity with anonymity is disclosed in "Amit Sahai, Brent Waters: Fuzzy Identity-Based Encryption. Advances in CryptoloGy—EUROCRYPT 2005, 24th Annual International Conference on the Theory and Applications of CryptoGraphic Techniques, Aarhus, Denmark, May 22-26, 2005, ProceedinGs. Lecture Notes in Computer Science 3494, pp. 457-473, SprinGer 2005, ISBN 3-540-25910-4".

The method disclosed in the above document will now be described. This method uses a key generating apparatus, an encrypting apparatus, and a decrypting apparatus.

First, it shows a notation. G and $G_T$ are cyclic groups of prime order q, and e is a bilinear mapping non-degenerative from G×G to $G_T$. Here, the bilinearity refers to the fact that $e(g^\alpha, g^\beta) = e(g,g)^{\alpha\beta}$ is established for every $\alpha, \beta \in Z/qZ$ and $g \in G$. In addition, non-degeneration refers to the fact that when g is a generator of G, e(g,g) becomes a generator of $G_T$. In addition, $a\hat{\,}b$ and $a^b$ have the same meaning.

In addition, N is a set $\{1, \ldots, n+1\}$. $S \subset N$.

$\Delta(i,S,x)$ is $\Pi \text{sub} > j \in S, j \neq i < .\text{sub} > (x-j)/(x-i)$.

$T(x) = g\hat{\,}(x\hat{\,}n)\Pi_{j=1}^{n+1} t[j]^{\Delta(j,N,x)}$.

FIG. 1 illustrates a key generating apparatus.

As shown in FIG. 1, the key generating apparatus according to the present exemplary embodiment includes input unit 410, calculation unit 420, and output unit 430. Calculation unit 420 includes polynomial expression generating unit 421 and attribute secret key generating unit 422 for each user.

In thus configured key generating apparatus 400, public key 403 (n, d, q, G, $G_T$, e, g[1], g[2], t[1], ..., t[n+1]) and master key 402(y) are input via input unit 410. Meanwhile, y is an element of Z/qZ, $g[1]=g^y$, and g[2] and g[i] regarding i=1, ..., m are elements randomly selected from G.

In addition, random number 404 and user identifier set 401 (ω) are input to key generating apparatus 400 via input unit 410.

Polynomial expression generating unit 421 randomly selects the (d−1)th polynomial q(x) in which f(0)=y by using master key 402, public key 403 and random number 404. Also, attribute secret key generating unit 422 for each user randomly selects $r[i] \in Z/qZ$ with respect to $i \in \omega$ and generates $D[i]=g[2]^{f(i)}T(i)^{r[i]}$, $d[i]=g^{r[i]}$.

As well, attribute secret key generating unit 422 for each user outputs D[i] and d[i] regarding $i \in \omega$ as attribute value secret key 407 via output unit 430.

FIG. 2 illustrates an example of an encrypting apparatus.

As shown in FIG. 2, the encrypting apparatus according to the present exemplary embodiment includes input unit 510, calculation unit 520, and output unit 530. The calculation unit 520 includes main cryptogram generating unit 521 and distributed cryptogram generating unit 522.

To thus configured encrypting apparatus 500, public key 403 (n, d, q, G, $G_T$, e, g[1], g[2], t[1], ..., t[n+1]) which has been input to key generating apparatus 400 illustrated in FIG. 1, message 501(M), random number 502, and attribute value set 503(ω') are input via input unit 510.

Calculation unit 520 generates s, an element of Z/qZ, by using random number 502, generates cryptogram 504 (ciph(ω', M)) as follows, and outputs the generated cryptogram.

Main cryptogram generating unit 521 generates main cryptogram 505 (E'=Me(g[1], g[2])$^s$, E''=$g^s$ from public key 403 (n, d, q, G, $G_T$, e, g[1], g[2], t[1], ..., t[n+1]) which has been input via input unit 510, message 501(M), and random number 502. In addition, distributed cryptogram generating unit 522 generates distributed cryptogram 506 $\{E[i]=T(i)^s\}i \in \omega'_o$ ciph(ω', M)=(ω', E', E'', $\{E[i]\}i \in \omega'$) from public key 403 (n, d, q, G, $G_T$, e, g[1], g[2], t[1], ..., t[n+1]) which has been input via input unit 510, random number 502, attribute value set 503 (ω').

Main cryptogram 505 (E'=Me(g[1], g[2])$^s$, E''=$g^s$ which has been generated by main cryptogram generating unit 521 and distributed cryptogram 506 $\{E[i]=T(i)^s\}i \in \omega'_o$ ciph(ω', M)=(ω', E', E'', $\{E[i]\}i \in \omega'$) which has been generated by distributed cryptogram generating unit 522 are output via output unit 530. In this case, attribute value set 503 (ω') which has been input via input unit 510 is also output via output unit 530.

FIG. 3 illustrates an example of a decrypting apparatus.

As shown in FIG. 3, the decrypting apparatus according to present exemplary embodiment includes input unit 610, calculation unit 620, and output unit 630. Calculation unit 620 includes cryptogram distributed decrypting unit 621, dispersion error correction data generating unit 622, and integrating unit 625.

To thus configured decrypting apparatus 600, public key 403 (n, d, q, G, $G_T$, e, g[1], g[2], t[1], ..., t[n+1]) which has been input to key generating apparatus 400 illustrated in FIG. 1, attribute value secret key 407 (D[i], d[i])$_{j \in \omega}$ which has been generated in key generating apparatus 400 illustrated in FIG. 1, and cryptogram 504 ciph(ω', M) which has been generated in encrypting apparatus 500 illustrated in FIG. 2 are input via input unit 610. Meanwhile, S=ω'∩ω, and |S|≥d.

As well, then, message 501(M) which has been input to encrypting apparatus 500 is restored in the following manner and then output.

First, cryptogram distributed decrypting unit 621 generates cryptogram set 623 $\{e(D[i], E'')\}_{i \in S}$ having a dispersion error by using main cryptogram 505 of cryptogram 504 ciph(ω', M) which has been input via input unit 610, and attribute value secret key 407 (D[i], d[i])$_{j \in \omega}$.

Dispersion error correction data generating unit 622 generates dispersion error correction data 624 $\{e(d[i], E[i])\}_{i \in S}$ by using distributed cryptogram 506 and attribute value set 507 of cryptogram 504 ciph(ω', M), attribute value secret key 407 (D[i], d[i])$_{j \in \omega}$, and public key 403 (n, d, q, G, $G_T$, e, g[1], g[2], t[1], ..., t[n+1]), which have been input via input unit 610.

Thereafter, integrating unit 625 restores message 501 from cryptogram set 623 $\{e(D[i], E'')\}_{i \in S}$ having a dispersion error as much as it has been generated by cryptogram distributed decrypting unit 621 and dispersion error correction data 624 $\{e(d[i], E[i])\}_{i \in S}$ which has been generated by dispersion error correction data generating unit 622, and outputs it as $M=E'\Pi_{i \in S}(e(d[i], E[i])/e(D[i], E''))^{\Delta(i, S, O)}$ via output unit 630.

However, the related art has a problem in that, because the cryptograms are proportional to the size (n) of the attribute value set, when the related art method is used for biometric authentication, the cryptograms will be proportional to the number of feature points indicating biometric information, ending in a very long data.

SUMMARY OF THE INVENTION

An object of the present invention is to provide a key generating apparatus, an encrypting apparatus, and a decrypting apparatus, whereby a cryptogram is not proportional to the size of an attribute value set but is proportional to the size of an error of an allowed attribute value set.

To achieve the above object, there is provided a key generating apparatus, which includes calculation means for calculating two groups G and $G_T$ whose orders are identical to each other and in which a bilinear mapping from two elements belonging to the group G and to the group $G_T$ is existent, and which receives a public key, a master key, an attribute value number, a user number, and a random number, and generates and outputs an attribute value secret key, including: an attribute value secret unit that sums up an attribute value indicated by the attribute value number with an element of the master key, and generates an attribute value secret, the reciprocal of the sum; a user secret unit that generates a user-specific random number by using the user number and the random number, and generates a user-specific secret from the user-specific random number and the public key; and an attribute secret key generating unit for each user that generates a user-specific attribute value secret key by exponentiating the attribute value secret which has been generated by the attribute value secret unit to the user-specific secret which has been generated by the user secret unit.

To achieve the above object, there is also provided an encrypting apparatus, which includes calculation means for calculating two groups G and $G_T$ whose orders are identical to each other and in which a bilinear mapping from the product of the group G and the Group G to the group $G_T$ is existent, and which receives a public key, an attribute value set, a threshold value, and a random number, and outputs cryptogram of a shared key including a main cryptogram, error correction data and an attribute value set, and a shared key, including: a random element generating unit that generates a random element from the random number; a shared key generating unit that generates the shared key from the random element which has been generated by the random element generating unit and the public key; a main cryptogram generating unit that generates the main cryptogram from the random element which has been generated by the random element generating unit, the public key, and the attribute value set; and an error correction data generating unit that generates the random element which has been generated by the random element generating unit, the public key, the threshold value, and the error correction data.

To achieve the above object, there is also provided a decrypting apparatus, which includes calculation means for calculating two groups G and $G_T$ whose orders are identical to each other and in which a bilinear mapping from the product of the group G and the Group G to the group $G_T$ is existent, and which receives a cryptogram of a shared key including a main cryptogram, error correction data and an attribute value set, a public key, and an attribute value secret key set, and outputs a shared key, including: a portion decryption key generating unit that selects one of elements of the attribute value secret key set, which is identical to one of elements of the attribute value set included in the cryptogram of the shared key, and that generates a portion decryption key from the selected element of the attribute value set; a cryptogram portion decrypting unit that generates a common key having an error from the portion decryption key which has been generated by the portion decryption key generating unit and the main cryptogram; an error correction key generating unit that generates an error correction key, data corresponding to a secret key over which the attribute value secret key set is insufficient for a secret key for all of the elements of the attribute value set, from the error correction data and the attribute value set; and an error correcting unit that generates the shared key from the shared key having an error which has been generated by the cryptogram portion decrypting unit and the error correction key which has been generated by the error correction key generating unit.

Because the exemplary embodiment of the present invention is configured as described above, persons, who can decrypt a cryptogram which has been generated by designating an attribute set, are limited to users who have received a secret key, with respect to attribute values as many as or larger than a threshold value, which is identical to the attribute values of the designated set, and the number is not proportional to the size of the set of the attributes, but is proportional to the size of an error of an allowed attribute value set.

DETAILED DESCRIPTION OF THE PREFERRED EMBODIMENTS

Exemplary embodiments of the present invention will now be described with reference to the accompanying drawings.

[Notation Used in Exemplary Embodiment]

G and $G_T$ are cyclic groups of prime order q, and e is a bilinear mapping non-degenerative from G×G to $G_T$. Here, the bilinearity refers to the fact that $e(g^\alpha, g^\beta) = e(g,g)^{\alpha \cdot \beta}$ is established for every $\alpha, \beta \in Z/qZ$ and $g \in G$. In addition, non-degeneration refers to the fact that if g is a generator of G, then e(g, g) is a generator of $G_T$. In addition, $a^{\char`\^}b$ and $a^b$ have the same meaning.

[Key Generating Apparatus]

Figure 1:
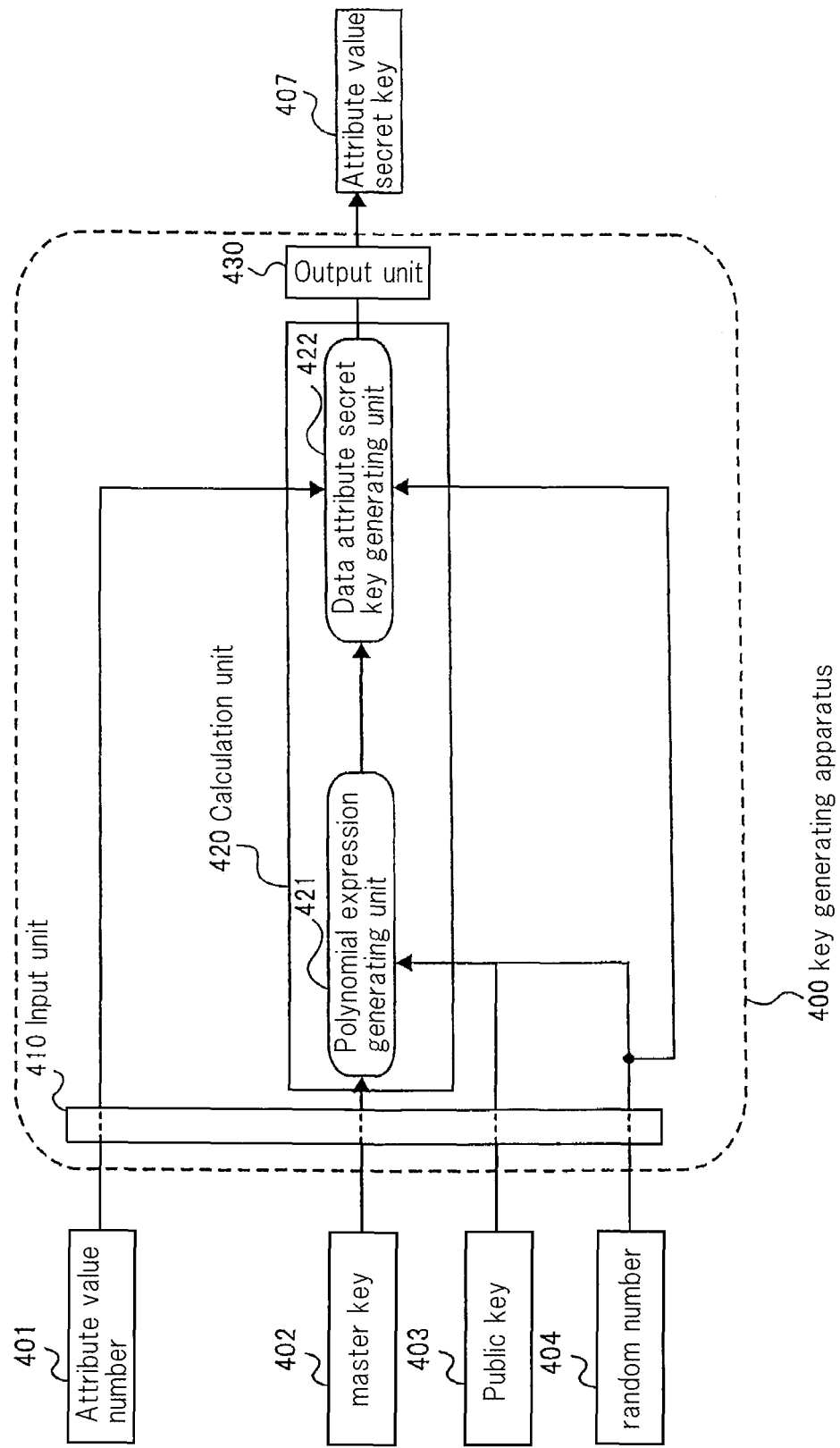
FIG. 1 illustrates an example of a key generating apparatus.
Figure 2:
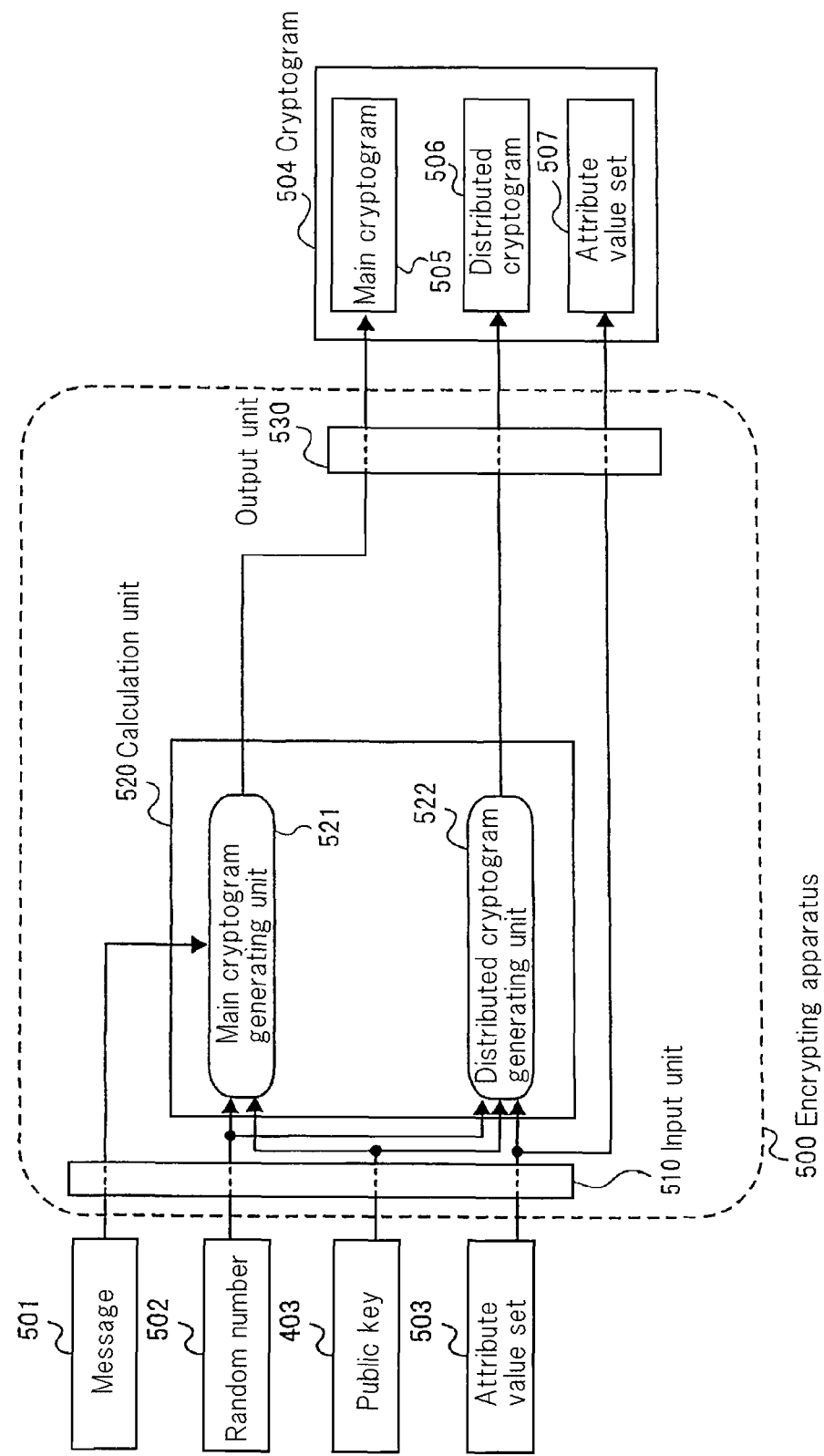
FIG. 2 illustrates an example of an encrypting apparatus.
Figure 3:
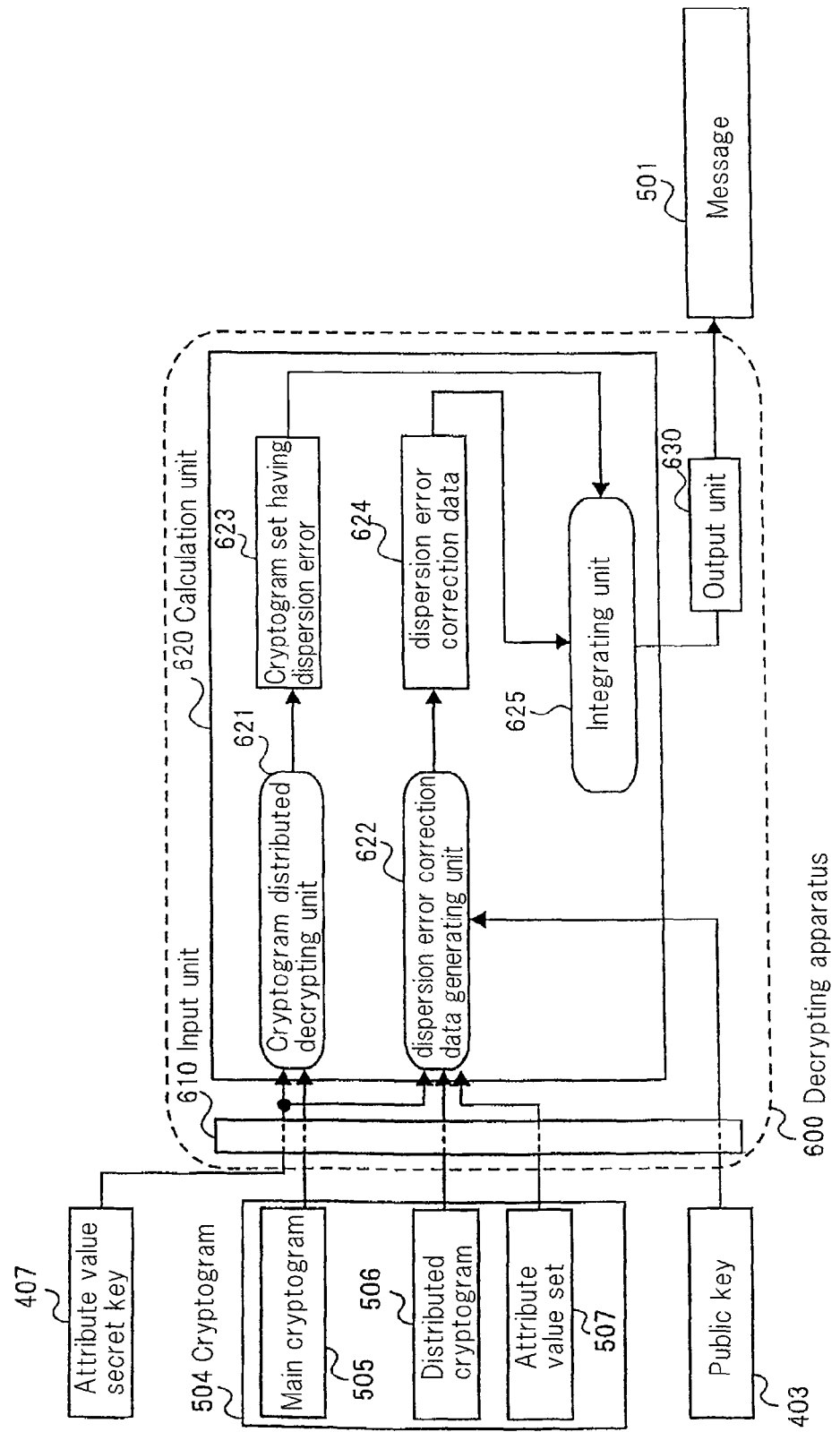
FIG. 3 illustrates an example of a decrypting apparatus.
Figure 4:
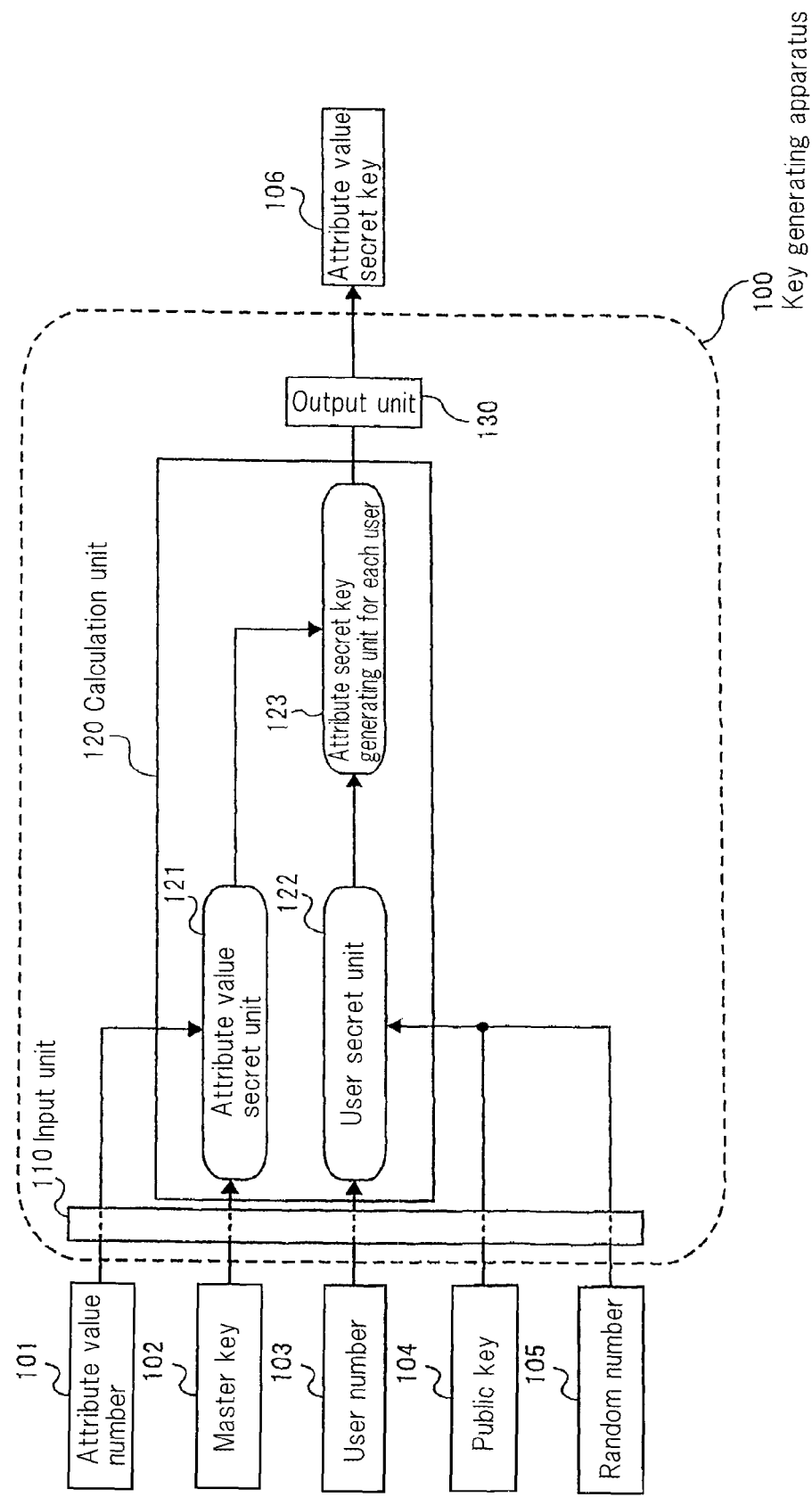
FIG. 4 illustrates a key generating apparatus according to an exemplary embodiment of the present invention.

FIG. 4 illustrates a key generating apparatus according to an exemplary embodiment of the present invention.

As shown in FIG. 4, the key generating apparatus according to the present exemplary embodiment includes input unit 110, calculation unit 120, and output unit 130. Calculation unit 120 includes attribute value secret unit 121, user secret unit 122, and attribute secret key generating unit 123 for each user.

Attribute value number 101, master key 102, user number 103, public key 104, and random number 105 are input to input unit 110.

Calculation unit 120, calculation means for calculating two groups G and $G_T$ the orders of which are identical to each other and in which a bilinear mapping from two elements belonging to group G and to the group $G_T$ is existent, generates an attribute value secret key 106 by using attribute value number 101, master key 102, user number 103, public key 104, random number 105 which have been input via input unit 110.

Output unit 130 outputs attribute value secret key 106 which has been generated by calculation unit 120.

Attribute value secret key 121 sums up attribute value number 101 with an element of master key 102 which has been input via input unit 110 and generates an attribute value secret, the reciprocal of the sum.

User secret unit 122 generates a user-specific random number by using user number 103 and random number 105 which have been input via input unit 110, and generates a user-specific secret from the user-specific random number and public key 104 which has been input via input unit 110.

Attribute secret key generating unit 123 for each user generates attribute value secret key 106 by exponentiating the attribute value secret, which has been generated by attribute value secret unit 121, to the user-specific secret which has been generated by user secret 122.

The operation of key generating apparatus 100 configured as described above will now be explained.

Public key 104 (m, q, G, $G_T$, e, g, y, g[1], . . . , g[m]) and master key 102 ($\omega$, $\chi$, $\delta$) are input to key generating apparatus 100 via input unit 110. Here, m is the maximum element number of an attribute value set. In addition, $\omega$, $\chi$, $\delta$ are sources of Z/qZ, and g is a generator of G. In addition, regarding i=1, . . . , m, $g[i]=g^{\chi^i}$. Also, $y=g^\omega$, $G=e(g, g^{67})$.

In addition, random number 105, user number 103(i), and attribute value number 101(j) are input to key generating apparatus 100 via input unit 110. Meanwhile, $\theta[j] \in Z/qZ$ is uniquely determined from attribute value number 101(j). This corresponding relationship may be given by a hash function or previously determined.

Key generating apparatus 100 generates random number element $\phi[i]$, an element of Z/qZ, by using random number 105 which has been input via input unit 110, generates attribute value secret key 106 (skey(i, j)) corresponding to identifier j of user i, and outputs the same.

User secret unit 122 generates a user-specific random number by using user number 103 and random number 105 which have been input via input unit 110, and generates a user-specific secret $(g^{\phi[i]}, g^{(\omega\phi[i]-\delta)})$ from the user-specific random number and public key 104 which has been input via input unit 110. In this manner, user secret unit 122 generates the user-specific secret including the element obtained by exponentiating the generated user-specific random number to one element of public key 104 and an element obtained by exponentiating the output of a linear function of the generated user-specific random number to another element of public key 104.

Attribute value secret unit 121 sums up attribute value number 101 with an element of master key 102 which have been input via input unit 110, and generates an attribute secret $1/(\chi+\theta[j])$, the reciprocal of the sum.

Thereafter, attribute secret key generating unit 123 for each user generates $skey(i,j)g=(d_i, d_{i,j})=(g^{\phi[i]}, g^{(\omega\phi[i]-\delta)/(\chi+\theta[j])})$ by exponentiating attribute value secret $1/(\chi+\theta[j])$ which has been generated by attribute value secret unit 121 to user-specific secret $(g^{\phi[i]}, g^{(\omega\phi[i]-\delta)})$ which has been generated by user secret unit 122, and outputs attribute value secret key 106 via output unit 130.

[Encrypting Apparatus]

Figure 5:
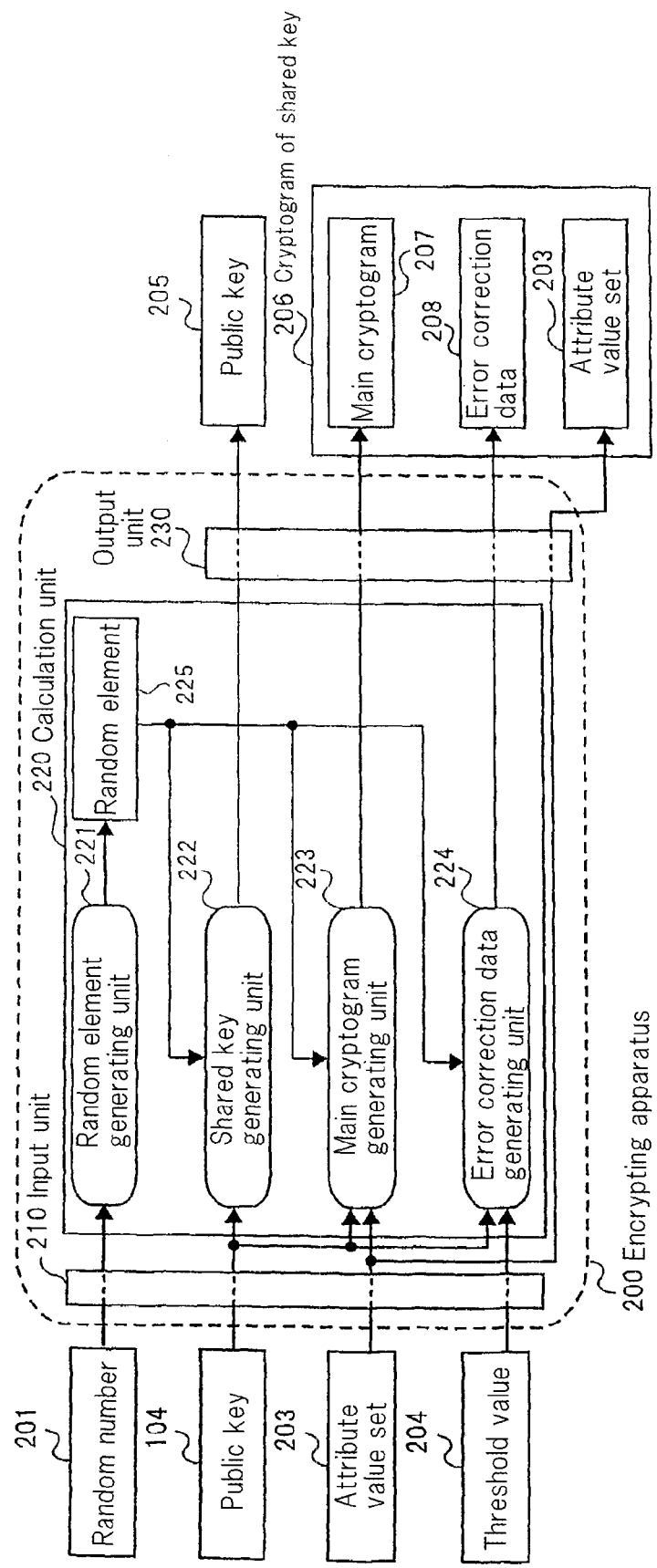
FIG. 5 illustrates an encrypting apparatus according to an exemplary embodiment of the present invention.

FIG. 5 illustrates an encrypting apparatus according to an exemplary embodiment of the present invention.

As shown in FIG. 5, the encrypting apparatus according to the present exemplary embodiment includes input unit 210, calculation 220, and output unit 230. Calculation unit 220 includes random element generating unit 221, shared key generating unit 222, main cryptogram generating unit 223, and error correction data generating unit 224.

Public key 104, random number 201, attribute value set 203, and threshold value 204 are input to input unit 210.

Calculation unit 220, calculation means for calculating two groups G and $G_T$ the orders of which are identical to each other and in which a bilinear mapping from the product of group G and Group G to group $G_T$ is existent, generates shared key 205 and cryptogram 206 of the shared key including main cryptogram 207, error correction data 208, and attribute value set 209, by using public key 104, random number 201, attribute value set 203, and threshold value 204 which have been input via input unit 210.

Output unit 230 outputs shared key 205 and cryptogram 206 of the shared key.

Random element generating unit 221 generates random element 225 from random number 201 which has been input via input unit 210.

Share key generating unit 222 generates shared key 205 from public key 104 which has been input via input unit 210 and random element 225 which has been generated by random element generating unit 221.

Main cryptogram generating unit 223 generates main cryptogram 206 constituting cryptogram 206 of the shared key from public key 104 and attribute value set 203 which have been input via input unit 210 and random element 225 which has been generated by random element generating unit 221.

Error correction data generating unit 224 generates error correction data 208 constituting cryptogram 206 of the shared key from public key 104 and threshold value 204 which have been input via input unit 210 and random element 225 generated by random element generating unit 221.

The operation of encrypting apparatus 200 configured as described above will now be explained.

Public key 104 (m, q, G, $G_T$, e, g, y, g[1], . . . , g[m]), random number 201, attribute value set 203 (S($\subset$ set of natural numbers)), and threshold value 204(t) are input to encrypting apparatus 200 via input unit 210. Here, it is assumed that the size of S is m and threshold value t is equal to or smaller than m.

Encrypting apparatus 200 generates random element 225 ($\rho$), an element of Z/qZ, by using random number 201 which has been input via input unit 210, and generates and outputs common key 205 (key) and cryptogram 206 (ciph(S)) of the common key as follows.

Random element generating unit 221 generates random element 225 ($\rho$), the element of Z/qZ, from random number 201 which has been input via input unit 210.

Next, shared key generating unit 222 generates shared key 205 (key=$G^\rho$) from public key 104 which has been input via input unit 210 and random element 225 which has been generated by random element generating unit 221.

Main cryptogram generating unit 223 generates 207 (c=g^($\rho\Pi_{j\in S}(\chi+\theta[j])$)) constituting cryptogram 206 of the shared key from public key 104 and attribute value set 203 which have been input via input unit 210 and random element 115 which has been generated by random element generating unit 221. That is, main cryptogram generating unit 223 exponentiates each element of the set of data that can be generated by using the product and the sum from elements of attribute value set 203 to one of elements of each different public key 104, and takes their product to generate the sum of one element of the master key and one element of the attribute value set 203 with respect to each element of each attribute value set 203, and multiplies a value obtained by multiplying all of the obtained sum to random element 225 which has been generated by random element generating unit 221 to a certain element of public key 104, thus generating main cryptogram.

In addition, error correction data generating unit 224 generates error correction data 208 $((c[i])_{i=0, \ldots, m-t} = (y\hat{}(\rho\chi^i))_{i=0, \ldots, m-t}, (d[i])_{i=1, \ldots, m-t} = (g\hat{}(\rho\chi^i))_{i=0, \ldots, m-t})$ constituting cryptogram 206 of the shared key from public key 104 and threshold value 204 which have been input via input unit 210 and random element 225 which has been generated by random element generating unit 221. That is, error correction data generating unit 224 generates elements obtained by subtracting a threshold value from the number of elements of the attribute value of attribute value set 203, namely, the number of elements proportional to an error, as error correction data 208, and each element of this error correction data 208 is obtained by exponentiating random element 225 which has been generated by random element generating unit 221 to a certain element of public key 104.

Meanwhile, $g\hat{}(\rho\Pi_{j \in S}(\chi + \theta[j]))$ is calculated as follows.

Regarding $j = 0, \ldots m$, it is assumed that $a[j] = (1/j!)(\partial^j/\partial\chi^j) (\Pi_{j \in S}(\chi + \theta[j]))|_{\chi=0}$.

Then, it is calculated such that $g\hat{}(\rho\Pi_{j \in S}(\chi + \theta[j])) = \Pi_{j=0}^m g[j]^{\rho a[j]}$.

Thereafter, cryptogram 206 $(\text{ciph}(S) = (S, t, c, (c[i])_{i=0, \ldots, m-t}, (d[i])_{i=0, \ldots, m-t}))$ of common key is output via output unit 230.

[Decrypting Apparatus]

Figure 6:
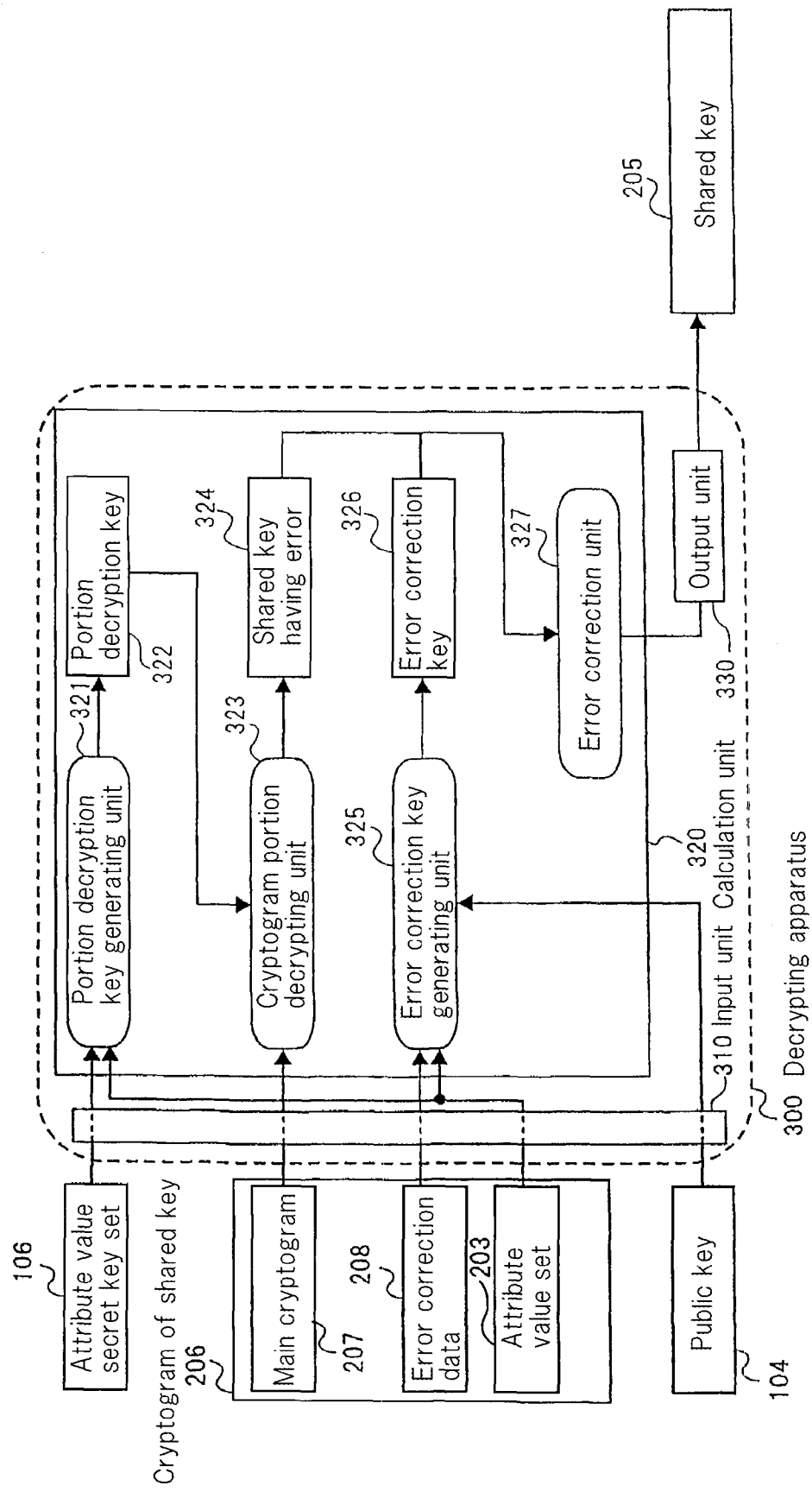
FIG. 6 illustrates a decrypting apparatus according to an exemplary embodiment of the present invention.

FIG. 6 illustrates a decrypting apparatus according to an exemplary embodiment of the present invention.

As shown in FIG. 6, the decrypting apparatus according to the present exemplary embodiment includes input unit 310, calculation unit 320, and output unit 330. Calculation unit 320 includes portion decryption key generating unit 321, cryptogram portion decrypting unit 323, error correction key generating unit 325, and error correction unit 327.

Attribute value secret key set 106, cryptogram 206 of a shared key, and public key 104 are input to input unit 310.

Calculation unit 320, calculation means for calculating two groups G and $G_T$ the orders of which are identical to each other and in which a bilinear mapping from the product of group G and Group G to group $G_T$ is existent, generates shard key 205 by using attribute value secret key set 106, cryptogram 206 of a shared key, and public key 104 which have been input via input unit 310.

Output unit 330 outputs shared key 205 which has been generated by calculation unit 320.

Portion decryption key generating unit 321 selects elements of the attribute value secret key set which has been input via input unit 310, and which are consistent with one of the elements of attribute value set 203 included in cryptogram 206 of the shared key which has been input via input unit 310, and generates portion decryption key 322 from them.

Cryptogram portion decrypting unit 323 generates shared key 324 having an error from portion decryption key 322 which has been generated by portion decryption key generating unit 321 and cryptogram 206 of the shared key which has been input via input unit 310.

Error correction key generating unit 325 generates error correction key 326, namely, data corresponding to a secret key in which attribute value secret key set 106 is insufficient for a secret key with respect to every element of attribute value set 509, by using error correction data 208 and attribute value set 203 included in cryptogram 206 of the shared key which has been input via input unit 310 and public key 104 which has been input via input unit 310.

Error correction unit 327 generates shared key 205 from shared key 324 having an error which has been generated by cryptogram portion decrypting unit 323 and error correction key 326 which has been generated by error correction key generating unit 325.

The operation of decrypting apparatus 300 configured as described above will now be explained.

Public key 104 $(m, q, G, G_T, e, g, y, g[1], \ldots, g[m])$ which has been input to key generating apparatus 100 as shown in FIG. 4 and encrypting apparatus 200 as shown in FIG. 5, cryptogram 206 $(\text{ciph}(S))$ of the shared key which has been generated by encrypting apparatus 200 as shown in FIG. 5, and attribute value secret key set 106 $\{\text{skey}(i, j)\}_{j \in S[i]}$ which has been generated by key generating apparatus 100 as shown in FIG. 4 are input to decrypting apparatus 300. In this case, it is assumed that attribute value set 203 $(S[i])$ is a subset of S, and user i possesses skey$(i, j)$ in which $j \in S[i]$. In addition, the number of elements of S[i] is a threshold value t (preferably, it is more than t, but here t is selected).

Decrypting apparatus 300 restores and outputs shared key 205 (key) as follows.

Portion decryption key generating unit 321 selects elements from the attribute value secret key set which has been input via input unit 310, and which are consistent with one of the elements of attribute value set 203 included in cryptogram 206 of the shared key which has been input via input unit 310, and generates portion decryption key 322 $(d[S[i]] = g\hat{}((\omega\phi[i] - \delta)/\Pi_{j \in S[i]}(\chi + \theta[j])))$ from those elements. That is, portion decryption key generating unit 321 selects elements of the attribute value secret key set by the number of a threshold value or larger, which are consistent with one of the elements of the attribute value set 203 included in cryptogram 206 of the shared key, exponentiates a constant that is determined from an attribute value to these elements, and multiplies them, to thus generate portion decryption key 322.

Next, cryptogram portion decrypting unit 323 generates shared key 324 $(\text{key}' = e(d_i, y[S[i]])/e(c, d[S[i]]))$ having an error from portion decryption key 322 which has been generated by portion decryption key generating unit 321 and main cryptogram 207 included in cryptogram 206 of the shared key which has been input via input unit 310.

Error correction key generating unit 325 generates error correction key 326 $(y[S[i]], G[S[i]]) = (y\hat{}(\rho\Pi_{j \in S\setminus S[i]}(\chi + \theta[j])), G\hat{}(\rho\Pi_{j \in S\setminus S[i]}(\chi + \theta[j]) - \rho\Pi_{j \in S[i]}\theta[j]))$, i.e., data corresponding to a secret key in which attribute value secret key set 106 is insufficient for a secret key with respect to every element of attribute value set 203, by using error correction data 208 and attribute value set 203 included in cryptogram 206 of the shared key which has been input via input unit 310 and public key 104 which has been input via input unit 310. That is, error correction key generating unit 325 selects all of those which are elements of attribute value set 203 included in cryptogram 206 of the shared key from error correction data 208 and attribute value set 203 and which do not have a corresponding attribute value secret key, exponentiates a constant that is determined from an attribute value to these elements with the exponential of error correction data, and multiplies them to generate error correction key 326.

Thereafter, error correction unit 327 performs decrypting by generating shared key 205 $(\text{key}) = (\text{key}'/G[S[i]])\hat{}(1/\Pi_{j \in S\setminus S[i]})$ from shared key 324 having an error which has been generated by cryptogram portion decrypting unit 323 and error correction key 326 which has been generated by error correction key generating unit 325, and outputs the same from output unit 330.

Meanwhile, in the present invention, processing within the key generating apparatus, the encrypting apparatus, and decrypting apparatus are realized by the above-described dedicated hardware. Besides, a program for realizing the function may be recorded in a recording medium that can be recorded by the key generating apparatus, the encrypting apparatus, and decrypting apparatus, can be read by the key generating apparatus, the encrypting apparatus, and decrypting apparatus so as to be executed. The recording medium that can be read by the key generating apparatus, the encrypting apparatus, and decrypting apparatus may be an HDD installed within the key generating apparatus, the encrypting apparatus, and decrypting apparatus in addition to a movable recording medium such as floppy disks, optical magnetic disks, DVDs, or CDs. The program recorded in the recording medium may be read and controlled by, for example, a control block to perform the processing as described above.

INDUSTRIAL AVAILABILITY

The key generating apparatus, the encrypting apparatus, and decrypting apparatus according to the present invention can be applicable for biometric authentication. A user having particular biometric data receives a secret key fitting his biometric data. Because the user can be certified by using his living body, the user can be reliably authenticated. In addition, the user can carry around his public key simply and shows it to others. A sender of a cryptogram may generate a cryptogram with respect to an obtained public key, and send it. Here, what matters is that, as for the public key and a secret key received upon user authentication, their original biometric data are not necessarily completely identical. If making them completely identical is a term for decrypting a cryptogram, the public key code using the biometric data will not work as intended. However, because the use of the present invention just requests them to be roughly identical, it can operate according to the public key code scheme.

While the invention has been shown and described with reference to the exemplary embodiments and examples, it will be understood by those skilled in the art that the invention is not limited thereto and that various changes may be made thereto without departing from the spirit and scope of the invention as defined by the following claims.

This application claims the priority of Japanese Patent Application No. 2007-138939 filed on May 25, 2007, the disclosures of which are incorporated herein by reference.

What is claimed is:

1. An encrypting apparatus, comprising:
a calculation unit that calculates two groups G and $G_T$ the orders of which two groups are identical to each other and in which a bilinear mapping from the product of group G and group G to group $G_T$ is performed, the calculation unit being arranged
  i) to receive, as inputs, a public key, an attribute value set, a threshold value which is smaller than a number of elements in the attribute value set, and a random number, and
  ii) to output, based on the received inputs
    a) a cryptogram of a shared key including a main cryptogram, error correction data and an attribute value set, and
    b) a shared key,
the calculating unit comprising:
  a random element generating unit that generates a random element from the random number;
  a shared key generating unit operatively connected to an output of the random element generating unit, the shared key generating unit generating the shared key from the random element which has been generated by the random element generating unit and the public key;
  a main cryptogram generating unit operatively connected to an output of the random element generating unit,
  the main cryptogram generating unit generating the main cryptogram from inputs of the random element, the public key, and the attribute value set; and
  an error correction data generating unit operatively connected to an output of the random element generating unit,
  the error correction data generating unit generating error correction data from, the public key, and the threshold value;
  wherein the cryptogram of the shared key has a size that is proportional to a difference between the number of elements in the attribute value set and the threshold value.

2. The apparatus of claim 1, wherein,
the main cryptogram generating unit exponentiates each element of a set of data that can be generated by using the product and the sum from elements of the attribute value set to one of the elements of each different public key, and multiplies them to generate the sum of one element of the master key and one element of the attribute value set with respect to each element of each attribute value set, and multiplies a value obtained by multiplying all of them to the random element which has been generated by the random element generating unit to a certain element of public key, thus generating a main cryptogram, and
the error correction data generating unit generates elements obtained by subtracting the threshold value from the number of elements of the attribute value set, as error correction data, and each element of this error correction data is obtained by exponentiating the random element which has been generated by the random element generating unit to a certain element of the public key.

3. A decrypting apparatus, comprising:
a calculation unit that calculates two groups G and $G_T$ the orders of which two groups are identical to each other and in which a bilinear mapping from the product of group G and group G to group $G_T$ is performed, the calculation unit arranged to receive, as inputs, i) a cryptogram of a shared key including a main cryptogram, error correction data and an attribute value set, a public key, and an attribute value secret key set, and ii) based on the received inputs, outputs a shared key, the calculation unit comprising:
a portion decryption key generating unit arranged to receive, as inputs, the attribute value secret key set and the attribute value set, the portion decryption key generating unit selecting one of the elements of the attribute value secret key set, which is identical to one of the elements of the attribute value set included in the cryptogram of the shared key, and generating a portion decryption key from the selected element of the attribute value set;
a cryptogram portion decrypting unit operatively connected to an output of the portion decryption key generating unit and arranged to receive, as an input, the main cryptogram,
the cryptogram portion decrypting unit generating a shared key having an error from the portion decryption key which has been generated by the portion decryption key generating unit and the main cryptogram;

an error correction key generating unit arranged to receive, as inputs, the main cryptogram, the error correction data, the attribute value set, and the public key, the error correction key generating unit generating an error correction key, data corresponding to a secret key over which the attribute value secret key set is insufficient as a secret key for all of the elements of the attribute value set, from the error correction data and the attribute value set; and an error correcting unit operatively connected to outputs of the cryptogram portion decrypting unit and the error correction key generating unit to receive therefrom from the shared key having an error which has been generated by the cryptogram portion decrypting unit and the error correction key which has been generated by the error correction key generating unit, the error correcting unit generating the shared key from the generated shared key having an error from the cryptogram portion decrypting unit and the generated error correction key from the error correction key generating unit;

wherein the cryptogram of the shared key has a size that is proportional to a difference between the number of elements in the attribute value set and the threshold value.

4. The apparatus of claim 3, wherein, the portion decryption key generating unit selects elements of the attribute value secret key set by the number of a threshold value or larger, which are consistent with one of the elements of the attribute value set included in the cryptogram of the shared key, exponentiates a constant determined from an attribute value to the selected elements, and multiplies them, to thus generate the portion decryption key, and the error correction key generating unit selects all of those which are elements of the attribute value set included in the cryptogram of the shared key from the error correction data and the attribute value set and which do not have a corresponding attribute value secret key, exponentiates a constant determined from an attribute value to the selected elements with the exponential of error correction data, and multiplies them to thus generate the error correction key.

5. An encrypting method, comprising:

calculating two groups $G$ and $G_T$ the orders of which two groups are identical to each other and in which a bilinear mapping from the product of group $G$ and group $G$ to group $G_T$ is performed, including inputting a public key, an attribute value set, a threshold value which is smaller than a number of elements in the attribute value set, and a random number, and outputting a cryptogram of a shared key including a main cryptogram, error correction data and an attribute value set, and a shared key, the method comprising the further steps of:

generating a random element from the input random number;

generating the shared key from the generated random element and the input public key;

generating the main cryptogram from the generated random element, the input public key, and the input attribute value set; and generating the error correction data from the generated random element, the input public key, and the input threshold value;

wherein the cryptogram of the shared key has a size that is proportional to a difference between the number of elements in the attribute value set and the threshold value.

6. The method of claim 5, wherein, each element of a set of data that can be generated by using the product and the sum from elements of the attribute value set is exponentiated to one of the elements of each different public key, which are multiplied to generate the sum of one element of the master key and one element of the attribute value set with respect to each element of each attribute value set, and a value obtained by multiplying all of them to the random element is multiplied to a certain element of public key, thus generating a main cryptogram, and elements obtained by subtracting the threshold value from the number of elements of the attribute value set are generated as error correction data, and each element of the error correction data is obtained by exponentiating the random element to a certain element of the public key.

7. A decrypting method, comprising:

calculating two groups $G$ and $G_T$ the orders of which two groups are identical to each other and in which a bilinear mapping from the product of group $G$ and group $G$ to group $G_T$ is performed, including inputting a cryptogram of a shared key including a main cryptogram, error correction data and an attribute value set, a public key, and an attribute value secret key set, and outputting a shared key, the method comprising the further steps of:

selecting one of the elements of the attribute value secret key set, which is identical to one of the elements of the input attribute value set included in the input cryptogram of the shared key, and generating a portion decryption key from the selected element of the attribute value set;

generating a shared key having an error from the generated portion decryption key and the input main cryptogram;

generating an error correction key, data corresponding to a secret key over which the attribute value secret key set is insufficient for a secret key for all of the elements of the attribute value set, from the input error correction data and the input attribute value set; and generating the shared key from the generated shared key having an error and the generated error correction key;

wherein the cryptogram of the shared key has a size that is proportional to a difference between the number of elements in the attribute value set and the threshold value.

8. The method of claim 7, wherein, elements of the attribute value secret key set by the number of a threshold value or larger, which are consistent with one of the elements of the attribute value set included in the cryptogram of the shared key, are selected, a constant determined from an attribute value is exponentiated to the selected elements, and which are then multiplied to generate the portion decryption key, and all of those, which are elements of the attribute value set included in the cryptogram of the shared key from the error correction data and the attribute value set and which do not have a corresponding attribute value secret key, are selected, a constant determined from an attribute value is exponentiated to the selected elements with the exponential of error correction data, which are then multiplied to generate the error correction key.

* * * * *

UNITED STATES PATENT AND TRADEMARK OFFICE
CERTIFICATE OF CORRECTION

PATENT NO.       : 8,594,332 B2                                            Page 1 of 1
APPLICATION NO. : 12/601597
DATED            : November 26, 2013
INVENTOR(S)      : Jun Furukawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this
Twenty-second Day of September, 2015

Michelle K. Lee
*Director of the United States Patent and Trademark Office*